United States Patent
Cho

(10) Patent No.: US 6,480,775 B2
(45) Date of Patent: Nov. 12, 2002

(54) METHOD FOR CONTROLLING CONTINUOUSLY VARIABLE TRANSMISSION

(75) Inventor: Yoon-Ho Cho, Anyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/898,619

(22) Filed: Jul. 3, 2001

(65) Prior Publication Data

US 2002/0082758 A1 Jun. 27, 2002

(30) Foreign Application Priority Data

Nov. 6, 2000 (KR) .............................................. 00-65483

(51) Int. Cl.$^7$ ............................................. G06F 17/00
(52) U.S. Cl. ............................. 701/51; 701/55; 701/59; 477/46
(58) Field of Search ................................ 701/51, 54, 55, 701/56, 57, 58, 59, 60, 61; 477/43, 46, 48

(56) References Cited

U.S. PATENT DOCUMENTS

| | | | | | |
|---|---|---|---|---|---|
| 4,793,217 | A | * | 12/1988 | Morisawa et al. | 74/866 |
| 5,114,383 | A | * | 5/1992 | Hirano et al. | 474/18 |
| 5,247,859 | A | * | 9/1993 | Agusa et al. | 74/866 |
| 5,685,800 | A | * | 11/1997 | Tokura | 477/90 |
| 5,976,054 | A | * | 11/1999 | Yasuoka | 477/48 |
| 6,138,070 | A | * | 10/2000 | Shimanaka et al. | 701/51 |
| 6,157,885 | A | * | 12/2000 | Sakaguchi et al. | 701/54 |
| 6,174,261 | B1 | * | 1/2001 | Watanabe et al. | 477/43 |
| 6,244,986 | B1 | * | 6/2001 | Mori et al. | 477/46 |

* cited by examiner

Primary Examiner—Tan Nguyen
(74) Attorney, Agent, or Firm—Christie, Parker & Hale, LLP

(57) ABSTRACT

A CVT control method includes the steps of calculating a target speed ratio of a CVT between maximum and minimum values of a plurality of speed ratios preset corresponding to a plurality of engine operation modes, and controlling the CVT according to the target speed ratio.

8 Claims, 3 Drawing Sheets

METHOD FOR CONTROLLING CONTINUOUSLY VARIABLE TRANSMISSION

CROSS-REFERENCE TO RELATED APPLICATION

This application claims priority of Korea patent Application No. 2000-65483, filed on Nov. 6, 2000.

BACKGROUND OF THE INVENTION (a) Field of the Invention

The present invention relates to a method for controlling a continuously variable transmission (CVT), and more particularly to a method capable of automatically controlling a speed ratio between economic and power modes without manual mode selection.

(b) Description of the Related Art

An automotive transmission is a device for transmitting engine torque to a drive shaft of a vehicle in variable speed ratios, and transmissions are usually classified into manual, automatic, and continuously variable transmissions (CVT).

Unlike manual and automatic transmissions that adapt a step variable is gear mechanism to provide fixed speed ratios, the CVT can vary the speed ratio continuously.

Accordingly, engine revolution speed can be optimally selected such that an engine operates at a preferred revolution-per-minute (rpm) relative to one of intended conditions such as maximum mileage, maximum output, minimum noise, minimum toxic gas emission, etc.

Typically, the speed ratio of the CVT is determined by engine torque-rpm maps that are preset according to intended conditions such as maximum mileage (economy mode) and maximum power (power mode).

FIG. 4 is a graph showing engine performance curves. Curve 1 indicates a plurality of iso-Brake Specific Fuel Consumption (iso-BSFC) curves and P0 indicates a point where the fuel consumption is the lowest. Curve 2 indicates a plurality of iso-power curves, which are equivalent to graphs of the equation y=power/x with various values of power, because the engine power is calculated by multiplying the engine rpm by the engine torque. Curve 3 indicates a maximum mileage curve, which passes through the lowest fuel consumption point P0. Curve 4 indicates a maximum power control curve.

In the CVT, the speed ratio can be randomly shifted in an available range such that the engine rpm and the engine torque can be randomly set regardless of the vehicle speed.

As a result, the CVT is controlled in such a way that the engine performs with a specific torque and rpm along the maximum mileage curve C3 to provide maximum mileage of a vehicle, and it performs with another specific torque and rpm along the maximum power control curve C4 for maximum power driving.

Accordingly, the speed ratio of the CVT is determined on the basis of a throttle valve opening and vehicle speed values specified in the map corresponding to the control mode that are determined relative to the intended driving condition, such as maximum mileage or maximum power.

Therefore, in order to accommodate the driver's intention, a conventional CVT control method requires mode selection input from the driver, and the mode selection process can cause the speed ratio to be abruptly changed, resulting in shift shock, vibration, and engine shaking.

SUMMARY OF THE INVENTION

The present invention has been made in an effort to solve the above problems of the prior art.

It is an object of the present invention to provide a CVT control method capable of determining an optimal speed ratio that lies betweenspeed ratios of the economy and power modes without manual mode selection.

To achieve the above object, a CVT control method of the present invention comprises the steps of calculating a target speed ratio of a CVT between maximum and minimum values of a plurality of speed ratios preset corresponding to a plurality of engine operation modes and controlling the CVT according to the target speed ratio.

The step of calculating the target speed ratio includes the steps of calculating a driving pattern index on the basis of throttle opening change rate, throttle operation frequency, and vehicle acceleration, and calculating the target speed ratio on the basis of the driving pattern index.

The target speed ratio can be calculated using a formula such as Tm=(Tp−Te)X+Te, where X is the driving pattern index, Te is an economy mode speed ratio, Tp is a power mode speed ratio, and Tm is the target speed ratio between Te and Tp.

The driving pattern index X can be calculated using a formula:

$$X = \left(\alpha \times \frac{a}{A0} + \beta \times \frac{b}{B0} + \gamma \times \frac{c}{C0}\right)/3$$

where, $\alpha$, $\beta$, and $\gamma$ are proportional weights;

a, b, and c are respectively a learned throttle opening change rate, learned throttle operation frequency, and learned vehicle acceleration; and A0, B0, and C0 are respectively a preset throttle opening change rate, preset throttle operation frequency, and preset vehicle acceleration.

In addition, the CVT control method according to the present invention can further includes the steps of determining if a learning condition is satisfied, and learning the driving pattern index when the learning condition is satisfied.

The learning condition can be defined as 'The present change rate of throttle opening is different from an average change rate of throttle opening up to this point by more than a predetermined difference, or the present throttle operation frequency is different from an average throttle operation frequency up to this point by more than a predetermined frequency, or the present acceleration is different from an average acceleration up to this point by more than a predetermined acceleration.

Furthermore, the CVT control method of the present invention can further include the step of determining whether the vehicle is running at a constant speed, wherein the step of calculating a driving pattern index is performed if the vehicle is not running at a constant speed.

When the vehicle is running at a constant speed, the target speed ratio is determined to be one of default engine operation modes, which is preferably an economy mode.

BRIEF DESCRIPTION OF THE DRAWINGS

The accompanying drawings, which are incorporated in and constitute a part of the specification, illustrate an embodiment of the invention,and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
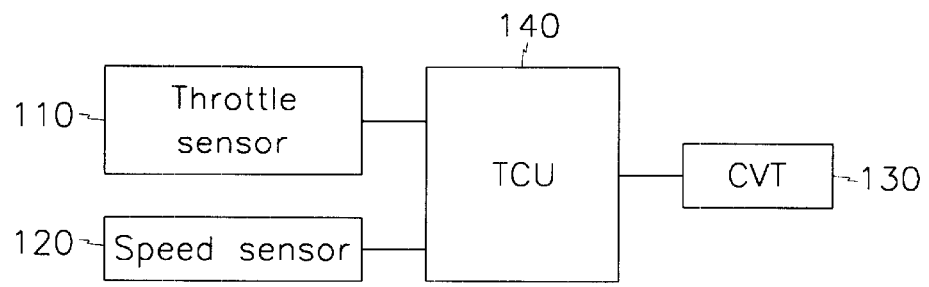
FIG. 1 is a block diagram illustrating a CVT control system according to the present invention.

FIG. 1 is a block diagram illustrating a CVT control system according to the present invention.

As shown in FIG. 1, the CVT control system comprises a throttle sensor 110 for sensing throttle opening, a speed sensor for sensing vehicle speed, a CVT 130 for transmitting torque from an engine (not shown) to an output shaft, and a transmission control unit (TCU) 140 electrically connected to the throttle sensor 110, speed sensor 120, and CVT 130 such that the TCU 140 controls the CVT 130 on the basis of parameters from the throttle and speed sensors 110 and 120.

A CVT control method for the above structured CVT control system will now be described with reference to the drawings.

Figure 2:
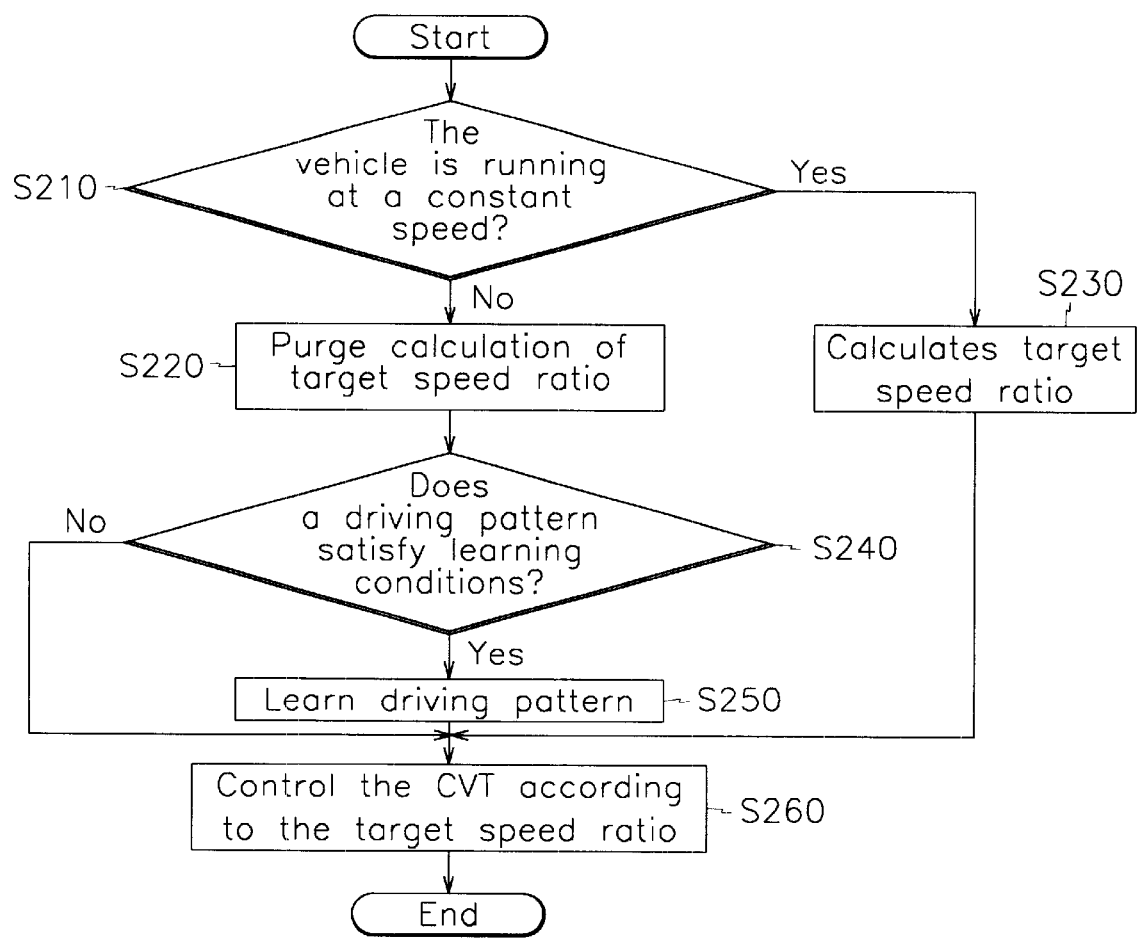
FIG. 2 is a flow chart illustrating a CVT control method according to a preferred embodiment of the present invention.

In FIG. 2, the TCU 140 determines whether the vehicle is running at a constant speed or not on the basis of the parameters from the speed sensor 120 at step S210.

If the vehicle is running at a constant speed at step S210, the TCU 140 calculates a target speed ratio for the CVT according to a default control mode at step S230 and then controls the CVT according to the calculated target speed ratio at step S260. In this case, a mode conversion is not required such that the CVT control is performed in the preset default control mode. It is preferred to set an economy mode as the default.

If it is determined that the vehicle is not running at a constant speed at step S210, the TCU 140 starts a fuzzy calculation for obtaining a target speed ratio at step S220. The fuzzy calculation is a calculation to determine the speed ratio between a preset power mode speed ratio and a preset economy mode speed ratio using a learning process.

The fuzzy calculation method for obtaining the target speed ratio in step S220 will be described in more detail hereinafter, with reference to FIG. 3.

Figure 3:
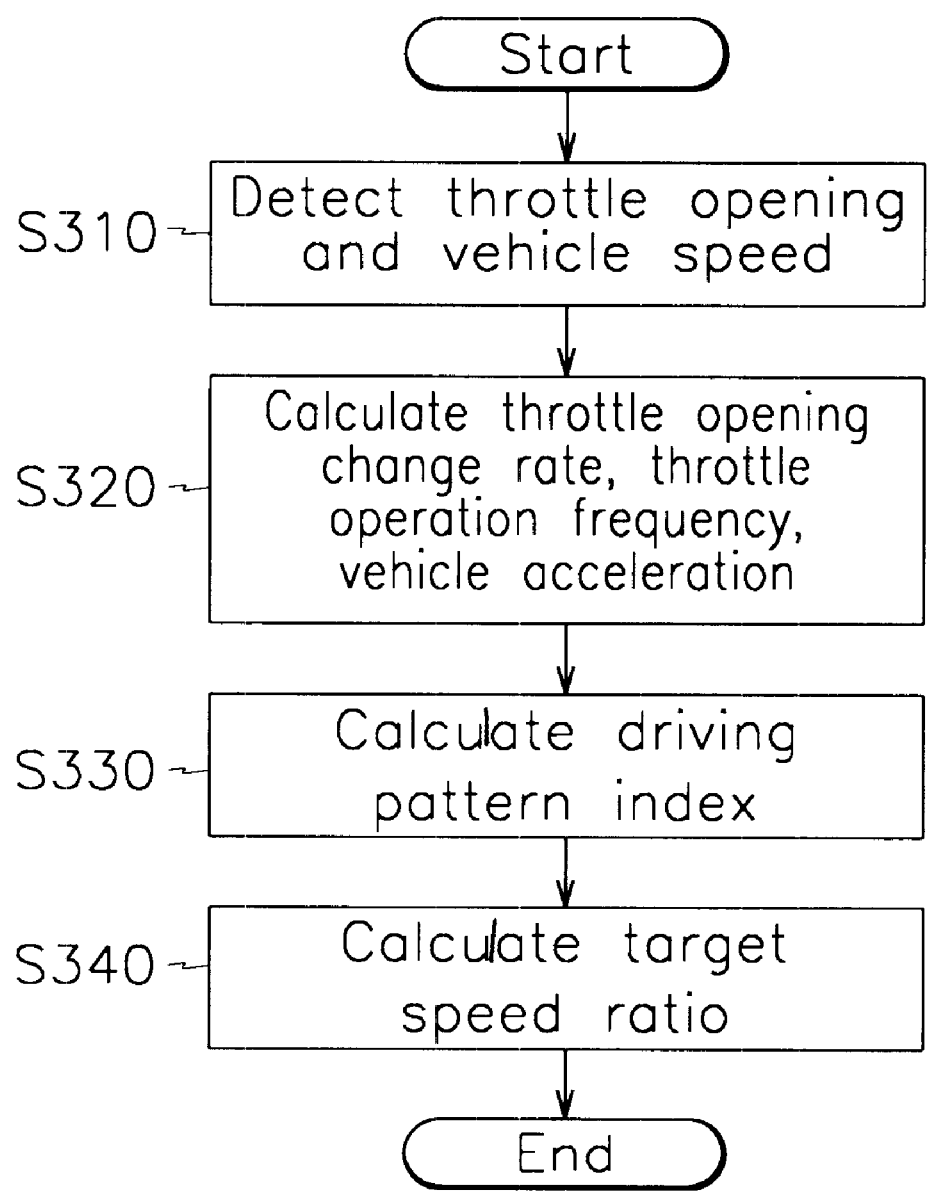
FIG. 3 is a flow chart illustrating sub-steps of a fuzzy calculation step of FIG. 2.
Figure 4:
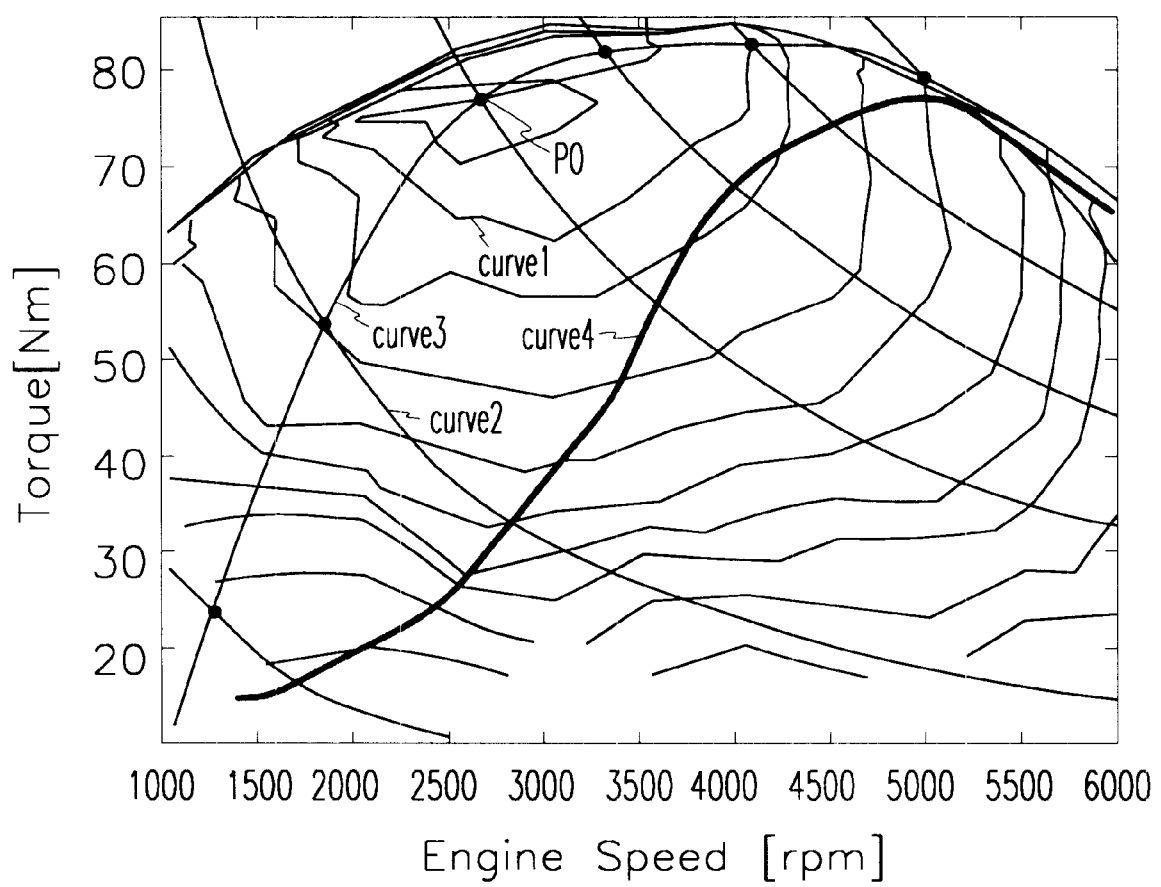
FIG. 4 is a graph illustrating exemplary engine performance curves.

In FIG. 3, the TCU 140 firstly receives the throttle opening and vehicle speed parameters detected by the throttle opening sensor 110 and vehicle speed sensor 120 at step S310. The vehicle speed obtained at step S210 can also be used instead of sensing again at step S310.

Next, the TCU 140 calculates the throttle opening change rate, throttle operation frequency, and vehicle acceleration at step S320.

The throttle opening change rate means how fast an acceleration pedal is depressed, that is, how fast the throttle opening is changed.

The throttle operation frequency means how frequently the acceleration pedal is operated in a predetermined period.

On the basis of the above parameters regarding the throttle opening change rate, throttle operation frequency, and vehicle acceleration, a driving pattern index (X) is calculated at step S330, using equation 1.

$$X = \left(\alpha \times \frac{a}{A0} + \beta \times \frac{b}{B0} + \gamma \times \frac{c}{C0}\right) / 3 \qquad \text{Equation 1}$$

In Equation 1, parameters a, b, and c respectively indicate a learned throttle opening change rate, a learned throttle operation frequency, and a learned vehicle acceleration.

The learned throttle opening change rate "a" is obtained by adding a throttle opening change rate index (Fa) to the previously calculated throttle opening rate. The result value is mapped to 0 if it is less than 0, and mapped to A0 if it is greater than A0. It is preferred that the throttle opening change rate index (Fa), which is learned as driving history is accumulated, is initially set to 0.

The learned throttle operation frequency "b" is calculated on the basis of throttle operation index (Fb) and B0, and a learned vehicle acceleration "c" is calculated on the basis of vehicle acceleration index (Fc) and C0, in the same way as the learned throttle opening rate "a."

The parameters A0, B0, and C0 respectively indicate a preset throttle opening change rate, a preset throttle operation frequency, and a preset vehicle acceleration. The preset throttle opening change rate, preset throttle operation frequency, and preset vehicle acceleration A0, B0, and C0 are respectively set to a maximum throttle opening change ratio, a maximum throttle operation frequency, and a maximum vehicle acceleration that can be generated by the driver's manipulation.

Accordingly, the pattern indices according to the throttle opening change rate, throttle operation frequency, and vehicle acceleration can be expressed as a/A0, b/B0, and c/C0, each value of which is greater than 0 and less than 1.

Also, the constants $\alpha$, $\beta$, and $\gamma$ are weights for the corresponding parameters. These constants are set as positive numbers under the condition "$\alpha+\gamma=1$."

Thus, the driving pattern index (X) calculated through Equation 1 has a value greater than 0 and less than 1.

After the calculation of the driving pattern index (X), the TCU 140 calculates a target speed ratio (Tm) at step S340.

The target speed ratio is calculated between the economy mode speed ratio (Te) and the power mode speed ratio (Tp) on the basis of the driving pattern index (X) using Equation 2.

$$Tm = (Tp-Te)X + Te \qquad \text{Equation 2}$$

The driving pattern index (X) has a value between 0 and 1 through Equation 2 such that the target speed ratio (Tm) has a value between the economy mode speed ratio (Te) and the power mode speed ratio (Tp).

Referring back to FIG. 2, after the calculation of the target speed ratio at step S220, the TCU 140 determines whether a predetermined learning condition is satisfied at step S240. The predetermined learning condition can be deliberately set as in the following example: The present change rate of the throttle opening is different from an average change rate of the throttle opening up to this point by more than a predetermined difference, or the present throttle operation frequency is different from an average throttle operation frequency up to this point by more than a predetermined frequency, or the present acceleration is different from an average acceleration up to this point by more than a predetermined acceleration amount.

If the learning condition is satisfied, the TCU 140 starts learning the present driving pattern represented by indices including throttle opening, throttle operation frequency and vehicle acceleration at step S250, and then controls the CVT according to the target speed ratio.

The driving pattern learning can be performed using a function that processes the driving pattern index in such a way that a function increases/decreases the throttle opening index according to whether the throttle opening change rate is greater than or less than the average throttle opening change rate, increases/decreases the throttle operation frequency index according to whether the throttle operation frequency is greater than or less than the average throttle operation frequency, and increases/decreases the vehicle's acceleration index according to whether the vehicle's acceleration is greater than or less than the vehicle's average acceleration.

Finally, the TCU 140 controls the CVT according to the previously calculated target speed ratio at step S260. If the learning condition is not satisfied at step S240, the TCU 140 controls the CVT 130 according to the target speed ratio calculated at step S220 without learning the driving pattern.

As described above, the CVT control method of the present invention controls the CVT in a continuously variable speed ratio between the economy and power modes on the basis of the driving pattern index so as to reflect the driver's driving pattern well as well as in the economy mode so as to obtain the maximum mileage when the vehicle is running at a constant speed. This eliminates the inconvenience of manual mode selection.

Furthermore, the driving pattern index is accumulatively updated and learned to reflect the latest driving pattern so as to prevent discontinuous driving pattern index changes in spite of the driver's abrupt change of the driving pattern, resulting in stable speed ratio control.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A CVT control method comprising the steps of:
    calculating a target speed ratio of a CVT that lies between maximum and minimum values of a plurality of speed ratios preset corresponding to a plurality of engine operation modes, said calculating a target speed ratio comprising,
        calculating a driving pattern index on the basis of throttle opening change rate, throttle operation frequency, and vehicle acceleration, and
        calculating the target ratio on the basis of the driving pattern index; and
    controlling the CVT according to the target speed ratio.

2. A CVT control method of claim 1 wherein the target speed ratio is calculated using a formula:

$$Tm=(Tp-Te)X+Te$$

where
    X is the driving pattern index;
    Te is an economy mode speed ratio;
    Tp is a power mode speed ratio; and
    Tm is the target speed ratio between Te and Tp.

3. A CVT control method of claim 1 wherein the driving pattern index is calculated using a formula:

$$X = \left(\alpha \times \frac{q}{A0} + \beta \times \frac{b}{B0} + \gamma \times \frac{c}{C0}\right)/3$$

where
    $\alpha$, $\beta$ and $\gamma$ are proportional weights;
    a, b and c are respectively a learned throttle opening change rate, a learned throttle operation frequency, and a learned vehicle acceleration rate; and
    A0, B0 and C are respectively a preset throttle opening change rate, a preset throttle operation frequency, and a present vehicle acceleration rate.

4. A CVT control method of claim 1 further comprising the steps of:
    determining if a learning condition is satisfied; and
    learning the driving pattern index when the learning condition is satisfied.

5. A CVT control method of claim 4 wherein the learning condition is satisfied when a present change rate of throttle opening is different from an average change rate of throttle opening up to a present point by more than a predetermined difference, or when the present throttle operation frequency is different from an average throttle operation frequency up to the present point by more than a predetermined frequency, or when the present acceleration is different from an average acceleration up to the present point by more than a predetermined acceleration amount.

6. A CVT control method of claim 1 further comprising the step of determining whether the vehicle is running at a constant speed, wherein the step of calculating a driving pattern index is performed if the vehicle is not running at a constant speed.

7. A CVT control method of claim 6 further comprising the step of determining the target speed ratio according to a default engine operation mode when the vehicle is running at a constant speed.

8. A CVT control method of claim 7 wherein the default mode is an economy mode.

* * * * *